INVENTOR
Robert S. Aries,
BY Hugo E. Neuberger
ATTORNEY

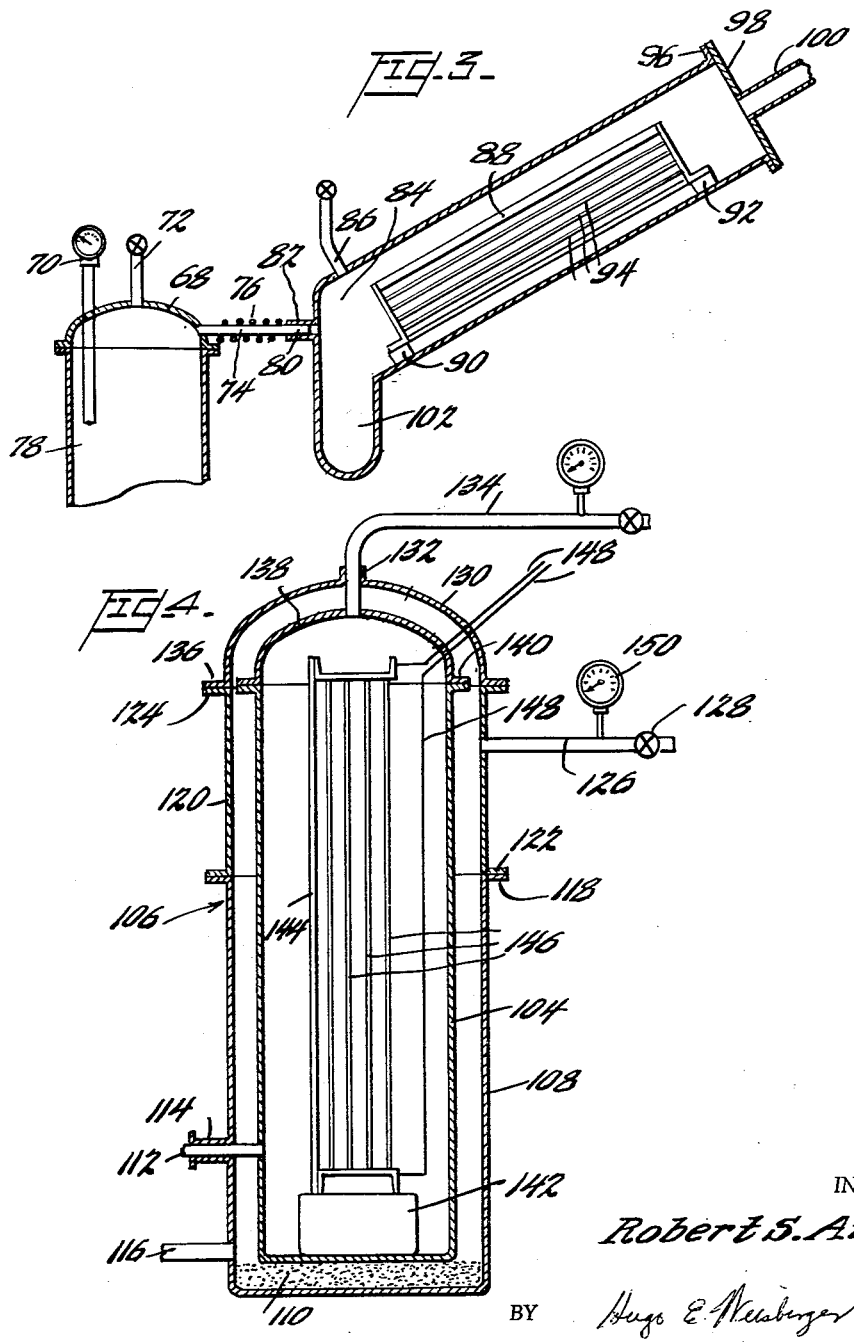

United States Patent Office 3,010,797
Patented Nov. 28, 1961

3,010,797
HIGH PURITY ELEMENTAL SILICON
Robert S. Aries, New York, N.Y.
(67 Case Stand, Geneva, Switzerland)
Filed July 26, 1957, Ser. No. 674,527
3 Claims. (Cl. 23—223.5)

This invention relates to elemental silicon of very high purity and to a novel method for its production. More particularly, the invention concerns a novel method for the preparation of very pure silicon monoxide, and for the further conversion thereof to very pure silicon or to very pure silicon dioxide.

There is a present and rapidly growing demand for super high purity elemental silicon in the electronics industry for use as a semi-conductor material. High purity in the case of elemental silicon to be used in transistors, rectifiers, solar batteries and other electronic devices is of a much higher order of purity than is customary in the chemical process industries, a purity higher than 99.999999% being currently required. While elemental silicon of somewhat lower purity can be further purified by rigorous acid washing of various kinds, or by zone refining methods, or by the use of both of these methods in sequence, these are costly procedures, accompanied by substantial losses of valuable material, and it still remains the primary objective in the production of elemental silicon for the uses indicated that the direct production of the elemental silicon from the raw materials should lead to an extremely pure product for further refining, if that should be required, and preferably to avoid altogether or to limit such further processing.

Silicon in the combined form, principally as silica or silicates is the second commonest element of the crust of the earth. The direct reduction of silica or silicates to silicon by any of the known methods yields elemental silicon of far too low a degree of purity for use in the electronic devices above indicated, although ferrosilicon of the order of purity of 98–99% silicon content is commercially available, and is generally known as "metallic" silicon even though silicon is not in fact a metal.

The purification of impure silicon is hampered by its extremely high melting point (1420° C.) and its extremely high boiling point (3500° C.), its comparatively easy formation of solid solutions or alloys at high temperatures, and the formation of compounds such as silicides with many of the materials with which it may come into contact during any high temperature step of the production or refining procedure. It is possible to enhance the purity of elemental silicon which is already of high purity, but such a procedure based on known methods of purification is economically effective only if the elemental silicon to be further purified contains at the most mere traces of impurities. And such methods of purification, as by acid treatment or zone refining, are ineffective with respect to certain deleterious impurities such as boron which are not segregated from the main body of a mass of elemental silicon by any known zone refining procedure.

As a consequence of the above considerations it has been necessary in all available methods for producing pure elemental silicon to use as the raw material not silica or any of the silicates, but rather the volatile compounds of silicon, such as the halides, because their volatility permits refining of these raw materials by fractionation processes such as distillation, and if they can be converted to solids, by fractionation processes such as crystallization.

It is thus natural that silicon tetrachloride which is a low boiling liquid (boiling point about 58° C.) has been frequently used as a raw material for the production of pure elemental silicon. Silicon tetrachloride is prepared commercially either by the chlorination of so-called "metallic" silicon, which is actually a ferrosilicon of 98% silicon content or even higher, or by the chlorination of silicon carbide which is easily available commercially. In either case the silicon tetrachloride can be prepared relatively easily, but it is always contaminated by the impurities present in the raw material or by derivatives thereof formed during the chlorination procedure. Such impurities are iron and aluminum chlorides, and chlorides of numerous other elements present in small but deleterious amounts in the raw material and carried over into the silicon tetrachloride. Besides small amounts of many metals, boron and phosphorus derivatives are also present. Careful fractionation by distillation serves to remove all but traces of these contaminants, so that silicon tetrachloride is currently available commercially with a purity of the order of 99.5% and even up to 99.9%.

While for some uses this may be a satisfactory degree of purity, it is not pure enough for use in the preparation of super high purity elemental silicon. The producers of this extremely pure elemental silicon are compelled to subject their raw material, silicon tetrachloride, as purchased or produced by themselves to extensive further refining and purification to obtain even a tolerably satisfactorily pure raw material, silicon tetrachloride, for the final processing which may be reduction by a metal or thermal decomposition. Silicon tetrabromide and silicon tetraiodide have also been proposed as raw materials for the production of pure elemental silicon, and in certain respects these halides may exhibit some advantages over silicon tetrachloride as a raw material, particularly in the case of the tetraiodide, which can be purified by crystallization, but they have the distinct disadvantage of much higher cost.

The present invention concerns (1) the preparation of extremely pure silicon monoxide by reacting silica and silicon under precise and closely controlled conditions, and (2) the conversion of the pure silicon monoxide to elemental silicon by hydrogen reduction thereof, or conversion to very pure silicon dioxide by oxidation.

In U.S. Patent 875,675 (1907), a method is disclosed for reducing silica with silicon, both substances being in granular form, by heating under reduced pressure in an electric furnace. No temperatures or other operating conditions are mentioned. In U.S. Patent 875,676 (1907) it is disclosed that the vitreous form of silicon monoxide can be sublimed or volatilized under reduced pressure to convert it to a finely divided powder. In the development of the novel method of the present invention, these and other prior art methods were found to be incapable per se of furnishing silicon monoxide of the requisite purity for subsequent conversion into super high purity silicon.

In accordance with the present invention, very pure silicon monoxide is formed in accord with the equation:

$$Si + SiO_2 \rightarrow SiO$$

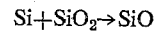

by reacting elemental silicon, such as high silicon content ferrosilicon, with silica (pure sand) at temperatures between about 1200° and 1400° C., preferably under high vacuum of the order of a few hundredths of a millimeter pressure. The silicon monoxide is vaporized as formed and condensed under vacuum or cover of an inert gas. The apparatus is made of a material which is inert to the reactants, such as fused silica or tantalum.

The volatility of the silicon monoxide is thus employed to separate it from all possible contaminants because these under the operating conditions mentioned are present either as elemental materials or as oxides and are much less volatile than silicon monoxide. Whereas many of the metal chlorides and non-metal chlorides are of considerable volatility and thus difficult to separate from silicon tetrachloride to the extent that not even a trace of them remains in the "purified" silicon tetrachloride, these same deleterious materials either in the elemental form or as oxides are completely non-volatile under the conditions under which silicon monoxide can be distilled. So effective is the procedure of this invention that I have been able to carry out the production of extremely high purity silicon monoxide not only from silica but also from a silicate of a refractory metal such as titanium or zirconium silicate.

The purity of the silicon monoxide as I have prepared it is so high that upon subsequent reduction to elemental silicon with hydrogen, which itself can be prepared in extremely high purity, contaminated at the most by traces of the noble gases which are completely inert in the conversion of silicon monoxide to silicon, the elemental silicon thus obtained is higher in purity than any elemental silicon heretofore produced.

Any iron or aluminum, for example, present in either raw material component is present either as the metal or as the corresponding oxide. Both the metals and their oxides have extremely low vapor pressures and extremely high boiling points, and thus the silicon monoxide will be vaporized and distilled at a temperature at which these other components or contaminants are absolutely non-volatile. The melting points and boiling points of the components most likely to be present even in small quantities (although others may be present) are given in the following table:

| Component | Melting Point, °C. | Boiling Point, °C. |
|---|---|---|
| $SiO_2$ | 1,710 | 2,230 |
| $SiO$ | | 1,300 |
| B | 2,300 | 2,550 |
| $B_2O_3$ | 577 | 1,500 |
| $TiO_2$ | 1,640 | 3,000 |
| $ZnO$ | >1,800 | |
| $ZrO$ | 2,700 | 4,300 |
| $Al_2O_3$ | 1,999 | 2,210 |
| $BeO$ | 2,585 | 3,900 |
| $CaO$ | 2,570 | 2,850 |
| Fe | 1,535 | 2,800 |
| $Fe_2O_3$ | 1,560 | |
| V | 1,730 | 3,000 |
| $V_2O_5$ | 800 | [1] 1,750 |

[1] Decomposes.

It will be seen that at the boiling point of silicon monoxide the only component likely to be present and to be carried over even in a small amount as vapor is boric oxide. However, if boric oxide is present it undoubtedly forms borates with metallic oxides, and these borates have higher boiling points than boric oxide and do not volatilize at the temperature at which silicon monoxide distills over. Boron in elemental form is non-volatile at the temperatures used for distilling silicon monoxide. In any case with proper operating procedures I have found that the silicon monoxide obtained in my process is spectroscopically free of boron even when the raw materials contain spectroscopically detectable amounts of boron, if the distillation is carried out in the proper range of 1200–1400° C.

For example, if pure silica sand containing 99.6% actual $SiO_2$ and coarsely powdered or crushed "metallic" silicon of about 99% actual silicon content are mixed in the appropriate stoichiometric amounts, and the mixture is subjected to distillation conditions at a pressure of 0.01 mm. of Hg absolute or less, at a temperature of 1200–1400° C., 93% of the total silicon content will distill over as silicon monoxide and a residue will be left containing the remaining 7% of the original silicon. This residue contains all the impurities originally present in the raw material plus some silica, presumably in the form of silicates.

While thermodynamic considerations indicate that the reaction of silica and silicon will occur at temperatures as low as 1100–1150° C., at these temperatures the rate of reaction is too low to be practical, and I therefore have found the higher temperatures to be preferable for practical operation.

According to another mode of carrying out my preparation of silicon monoxide, the charge may consist of such "metallic" silicon and a silicate, such as relatively pure zirconium silicate. If this silicate in finely powdered form is mixed with the stoichiometric amount of "metallic" silicon corresponding to the $SiO_2$ content of the zirconium silicate, and the mixture is heated under very high vacuum to 1300–1400° C., practically all the silicon present as silicate and as "metallic" silicon distills over and is condensed as silicon monoxide, leaving a residue of zirconium dioxide containing a small amount of $SiO_2$, and all the $TiO_2$, $Al_2O_3$ and the Fe of the original charge together with any other impurities present in the materials charged to the reducing furnace.

The silicon monoxide thus obtained by distillation and condensation is a dark brown brittle vitreous solid which is stable in the absence of oxygen or other reactive atmosphere and remains stable indefinitely if the receiver in which it is collected is filled with an inert atmosphere.

It can be re-vaporized by heating it to temperatures above 1300° C.

In accordance with another aspect of my invention, the vapor proceeding from the silicon monoxide production unit may be used without intermediate cooling be used directly for the production of very pure elemental silicon, but I have found it more convenient to separate the silicon monoxide as produced and to condense it, and later as required to re-vaporize it and to reduce the silicon monoxide vapor by means of pure hydrogen gas to elemental silicon according to the equation $$SiO + H_2 \rightarrow Si + H_2O$$

This reaction is best carried out in the presence of a considerable excess of hydrogen over the stoichiometric amount based on the above equation.

The reduction of silicon monoxide is preferably carried out in a tube made of a non-reactive material which permits diffusion of hydrogen through the body thereof, for example, a palladium tube into which hydrogen is diffused through the tube walls. The hydrogen thus diffused appears to be much more reactive than "ordinary" hydrogen which may however be used by mixing it with the silicon monoxide vapor. The hydrogen when it is to be used in the diffused form is caused to diffuse through the walls of the palladium tube by supplying hydrogen at an elevated pressure, 20 atmospheres, for example, to the exterior of the palladium tube, while the interior is maintained at a lower pressure which may be even atmospheric or subatmospheric pressure. The rate of diffusion of hydrogen through palladium is known to be approximately proportional to the square root of the ratio of the two pressures, the external and the internal. If the external pressure is raised, for example, from 5 atmospheres to 20 atmospheres while maintaining a constant internal pressure of hydrogen within the tube the rate of diffusion of the hydrogen through the palladium tube wall will be doubled. Zirconium or titanium may be used as the material of the reducing tube instead of palladium, but the diffusion of hydrogen through titanium or zirconium is much slower than through palladium.

The reducer tube of palladium or of other metal capable of permitting the diffusion of hydrogen is set within a steel jacket, providing an annular space between the steel jacket and the palladium tube, in which annular space the hydrogen at higher pressure is supplied for diffusion to the interior of the palladium reducer tube. The heating of the palladium tube is by internal electrical resistance units as will be described in more detail under the examples.

The reducing tube may however also be made of fused silica, in which case the heating unit, preferably of tantalum within the quartz tube is best energized by electrical induction, and hydrogen in the case of the use of a quartz tube is supplied by direct feed and not by diffusion. To prevent the reduced silicon from adhering to the tantalum heating units, whether the heating be by resistance or induction, the energizing current is periodically interrupted, leading to alternate heating and cooling of the heating unit, and as a result of the differences in thermal expansion of silicon and tatalum, the silicon will be periodically stripped from the tantalum and will fall into the reservoir space designed for this purpose. A period of heating of 15 to 30 minutes followed by an interruption of 1 minute to cause cooling suffices to cause the stripping action. If the silicon is allowed to build up to too great a thickness the pulsations in temperature will not permit the silicon to be properly stripped. It has been found that the tantalum becomes coated with a thin, very adherent layer which does not strip off during the temperature pulsations. This coating is probably tantalum silicide, but once formed it remains of constant thickness and protects the underlying metal, and since it is completely adherent to the underlying metal it does not detach and contaminate the silicon formed.

Instead of fused quartz tubes lithium or thorium porcelain tubes of high melting point can also be used. Also the heating units may be of columbium (niobium) instead of tantalum. The stripping action of the alternating temperatures may be adjudged from the data given in the following table:

| Element | M.P., °C. | B.P., °C. | Coefficient of Expansion |
|---|---|---|---|
| Ta | 2,996 | 4,100 | $7.9 \times 10^{-6}$ |
| Cb | 2,415 | 3,300 | $7.2 \times 10^{-6}$ |
| Si | 1,420 | 2,300 | $2.8 \times 10^{-6}$ |

The difference between the coefficient of expansion of elemental silicon, $2.8 \times 10^{-6}$ on the one hand, and of tantalum and columbium, $7.9 \times 10^{-6}$ and $7.2 \times 10^{-6}$ respectively on the other hand, is very large and is sufficient to cause the desired stripping action.

In accordance with a third aspect of my invention, I have found that the very pure silicon monoxide obtained in the first stage of the method may be converted to silicon dioxide of very high purity by reacting its vapor with oxygen or with air, and that this ultra-pure silicon dioxide may then be utilized as a starting material for the first stage reaction with silicon to form silicon monoxide. In this way, a portion of the silicon monoxide may be recycled to the starting point of the method, the double purification thus permitting the production of still higher purity silicon monoxide and elemental silicon. In addition, the ultra high purity silicon dioxide obtained by this oxidation of silicon monoxide may serve as a raw material for preparing products in which complete purity is desired, such as fused silica ware, pure synthetic quartz crystals, and the like.

The accompanying drawings illustrate a preferred form of apparatus in which the novel methods of my invention may be carried out, but it will be understood that these methods may also be successfully conducted in similar or equivalent types of apparatus.

In the drawings:

FIG. 3 is a sectional view of an apparatus for reducing silicon monoxide with hydrogen; and FIG. 4 is a sectional view of an alternative form of reduction apparatus.

Figure 1:
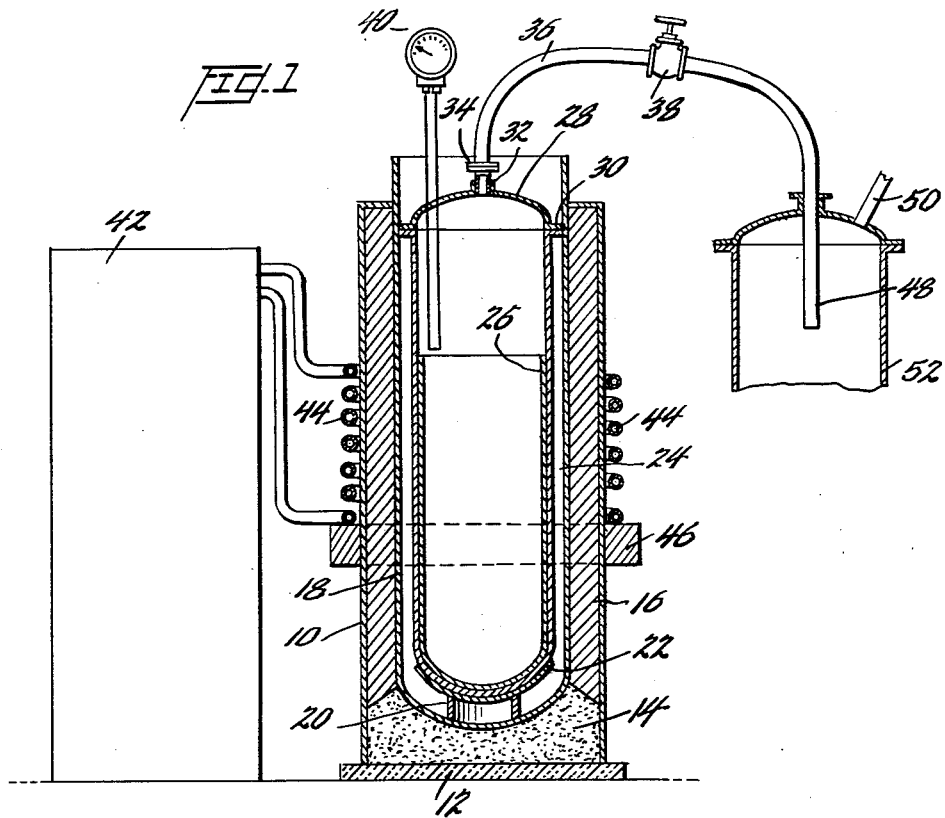
FIG. 1 is a side elevation of a still for carrying out the reaction between silicon and silica, the still portion being shown in cross-section.

The reaction between "metallic" silicon and silica may be carried out in a still which is represented in FIGURE 1. It comprises basically a tantalum vacuum still set within a mullite pot which in turn is set within a fused silica pipe.

Referring to FIGURE 1, 10 is an open, flat bottom fused silica tube, 9⅞ inches outside diameter, 9 inches inside diameter and 30 inches high, which rests on an asbestos plate 12. Within this is a mullite pot 18 open at the top with a hemispherical bottom. It is 8 inches outside diameter, 7½ inches inside diameter and 32 inches long. It rests on an insulating layer of sand 14 and the annular space 16 between the outer tube 10 and the mullite pot 18 is filled with magnesia insulating packing. Within the mullite pot 18 there is a short section of fused silica pipe 20 which acts as support for a curved piece of fused silica 22 on which the vacuum still pot rests. The vacuum still pot of heavy tantalum sheet 24 is 7 inches in outside diameter and 20 inches between tangents and slips easily into the mullite pot 18. Within the tantalum still 24 there is a loose tantalum sheet liner 26 which can be removed at the end of a run or after a series of runs for cleaning with less likelihood of mechanical damage than would be likely to the still itself if the charge is left in the still body.

The still top 28 is hemispherical and has a flange 30 to permit removal of the still top to discharge the contents after one or more runs. The domed top 28 has integrally united to it a flanged nozzle 32, two inches in diameter, with a flange 34, connected to a companion flange forming one end of the tantalum vapor line 36, containing tantalum-faced valve 38. The vapor line 36 is wound with a resistance heater of tantalum, not shown, to prevent solidification of silicon monoxide in it by local cooling during distillation. During operation at the high temperatures the dome and the vapor line are protected by shaped magnesia insulation, encased in a thin foil aluminum outside cover which is gastight. During all high temperature operations the entire furnace set up is shielded by argon to prevent attack on the tantalum by oxygen of the air. The shielding is not shown, nor the argon feed system. Dome 28 also has a pyrometer inlet for pyrometer 40.

Heating of the tantalum still is by electrical induction. The 20 kw. generator 42 supplies the high frequency current to water cooled copper coil 44 for induction heating. The coil rests on table 46 which can be raised or lowered mechanically by means not shown so that the heating zone may be located at whatever level it is desired. The electrical leads and water connections are flexible to permit this movement of table 46. Vapor line 36 leads to the condensing system 48 which contains also the connection 50 to the high vacuum source.

Figure 2:
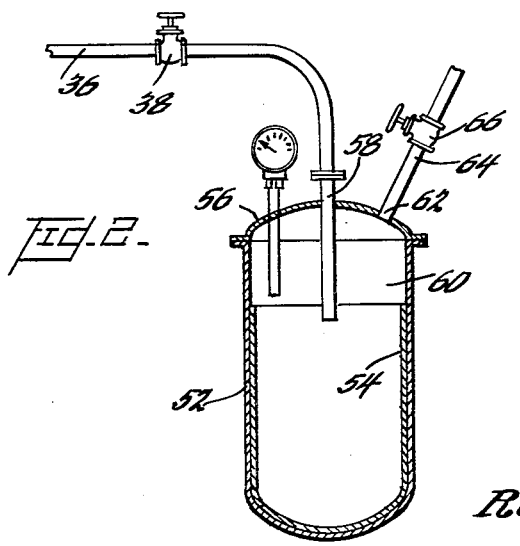
FIG. 2 is a sectional view of the condensing system used in conjunction with the reactor still of FIG. 1.

The details of the condensing system are shown in FIGURE 2. This comprises a tantalum still 52 having a tantalum liner 54, identical in all respects with the still shown in FIG. 1 and similarly mounted and provided with a similar heating system. The same generator 42 can serve both stills 24 and 52 by making required changes in connections, or separate induction heating systems may be used. The auxiliaries and the mountings are not shown in FIGURE 2 as they are identical with those of FIGURE 1. The only differences are in the domes 28 and 56, and particularly in the connections and auxiliaries of the respective domes.

The vapor line 36 with its valve 38 has a flange connection 58 welded thereon, but extends beyond 58 into the interior 60 of still 52. During operation of the still of FIGURE 1, the still of FIGURE 2 acts as a condenser or receiver. There is an exit nozzle 62 with line 64 attached thereto, and with valve 66 similar to valve 38 in the line 36, leading to a high capacity source of high vacuum, capable of maintaining a pressure of 0.01 to 0.0001 mm. of mercury throughout the entire system of the 2 stills with their interconnecting piping.

The method of operation may be to load liner 26 with the required charge which will be about 10–11 pounds of the proper mixture of crushed "metallic" silicon and sand. The dome 28 is then fastened into position, the vapor line 36 is attached, valve 38 is opened and the receiver 52 is properly connected. The high vacuum source is operated to exhaust the system to the low pressure required. When all leakages have been corrected, the insulation over domes 28 and 56 is applied, the shielding arrangement is positioned and an argon or other inert gas flow is begun to displace all air and oxygen in contact with tantalum metal, and the shielding by argon is continued until the run is completed. At least an hour's flow of argon is used before heat is applied. Then under high vacuum, the resistance heaters for the vapor line are turned on to provide a temperature of 1300° C. to prevent solidification in the vapor line. Then the induction heating generator is operated. The charge is heated first at the top and then the heat is moved downward until the reaction begins. The pyrometer 40 in the vapor space will indicate a flow of vapor by a sudden rise in temperature to 1100–1150° C., but in order to produce a sufficient rate of vaporization it is necessary to heat the charge so that a vapor temperature of about 1300°–1400° C. is reached. When the pyrometer indicates that the vapor temperature is above 1300° C. the rate is quite rapid and at 1350°–1400° C. the distillation of such a charge will take about 4 hours. The receiver is not heated except incidentally by incoming silicon monoxide vapor and condensation occurs in it. When the run is over which is indicated by a decreasing temperature indicated by pyrometer 40 at constant energy supply, heating is discontinued, but vacuum is maintained. Both stills are allowed to cool over night with the shielding flow of argon maintained, and in the morning, valve 38 is closed, and still 24 is opened and disconnected either at flange 34, whereupon a new charge can be added through nozzle 32 without removing liner 26, or the still can be opened at the flange 30, and the liner 26 removed, for treatment in hydrochloric acid to remove part of the residue by solution and to loosen the rest of the residue so that it can easily be removed. With sufficiently pure raw materials removal of the liner need be only after every 5th or 6th run.

The silicon monoxide is now in the receiver 52 in which it cools and solidifies under vacuum or under inert gas cover. The dome of the second still 56 is removed and is replaced by another dome, 68, forming part of the hydrogen reduction apparatus shown in FIGURE 3.

FIG. 3 shows a form of apparatus which may be used to carry out the reduction of silicon monoxide with hydrogen in the second stage of my novel process. This apparatus comprises a dome 68 adapted to be fastened to still 56. This dome has a pyrometer connection at 70, and a gas inlet tube 72, through which inert gas, such as purified argon may be admitted to tantalum still 78 under pressure, a vapor outlet tube of tantalum 74 surrounded by a resistance heater 76 of tantalum, which is protected by insulation not shown and so arranged that both the tantalum still 78, the dome 68, and the vapor line 74 are all insulated and shielded by inert gas. The vapor line 74 has an end portion 80, not covered by a resistance heater which extends into the nozzle 82 of a fused silica reducing vessel 84. The vessel 84 has an inlet 86 for hydrogen under pressure and contains within itself a platinum rod framework 88 resting on fused silica lugs 90 and 92. The platinum framework 88 has attached to it tantalum spaced foils 94. The platinum serves as a catalyst to cause reaction between silicon monoxide and hydrogen to form elemental silicon which is deposited largely on the tantalum foil; and water vapor which is swept out of the system by the excess hydrogen and by inert gas which may optionally be admitted by means of inlet 72. The fused silica reactor has a flanged end 96, which is ground to perfect flatness and is closed by an equally perfectly flat silica disk 98, which contains a nozzle 100 leading to a recovery system not shown, through which the exhaust gases consisting of water vapor, hydrogen, and as the case may be, argon, are removed. The fused silica tube 84 is heated by induction by high frequency current, not shown.

The fused silica tube 84 has a down leg or reservoir 102 in which silicon loosened from the tantalum foil by temperature pulsations drops, particularly if the furnace is gently tapped during operation. The dimensions of the main cylindrical portion of the quartz reducing tube are for example, 30 inches in length and 6 inches in diameter. The platinum rod framework is 20 inches in length and 4.5 inches in diameter, and the reservoir 102 is 6 inches in diameter and 8 inches deep. The reducing tube is set at an angle of 60° to the horizontal so that the reduced silicon will the more easily fall into the reservoir.

In operation of the apparatus of FIG. 3, the dome 68 is attached to the silicon monoxide receiver of FIG. 2, which is now to be used as a still in such a manner that the end portion 80 projects into the nozzle 82 of the fused silica reducing system. The platinum cage 88 and its tantalum foil are positioned, and the plate 98 is clamped into position. The necessary pieces of shaped insulation are applied, and the shielding gas is flowed over the tantalum surfaces. Argon is then admitted through inlet 72, and run for one hour to displace all other gas from the entire system. Then hydrogen is admitted through nozzle 86, and the heater 76 is turned on to provide a temperature of 1400° C. within the tube 74. The induction heater for still 78 is then turned on to provide a temperature for silicon monoxide vapor within the still of approximately 1400° C. The induction heater for the reducing tube is then turned on to provide a temperature in tantalum foils 94 of 1400° C. When the reduction to elemental silicon is proceeding rapidly the heating of the tantalum foils within tube 84 is interrupted every 15 minutes for 1 minute to cool the charge and cause stripping of silicon from the tantalum foils.

If the original charge to produce silicon monoxide is 11 pounds of silica and silicon "metal," there will be about 10 to 10.2 pounds of silicon monoxide in the condenser to be re-vaporized. This approximately 10 pounds of silicon monoxide will yield under the conditions of my process 6 to 6.2 pounds of elemental silicon. The reservoir 102 has a capacity of approximately a full charge. At the end of the operation when the silicon monoxide has been completely evaporated, the heaters are all closed off, but the shielding gas flow is continued until the temperature of the system has dropped to 300° C. or less and the flow of argon through inlet 72 is continued to displace any other gases from the system and to provide an inert gas blanket during the cooling. The elemental silicon which collects in the reservoir 102 is completely free from adhesion to the walls and when the apparatus is disassembled the elemental silicon flows freely from the reservoir 102 into the cylindrical portion of the tube and can be poured from the open end. Some elemental silicon is present in the main cylindrical portion of tube 84 and when the platinum cage and its tantalum foils are removed this silicon is found both in crystalline and powder form, with a few occasional lumps. These are easily removed by pushing with a clean fused silica rod of sufficient thickness to prevent breakage of the rod. Adhesion of silicon to the walls of the fused silica reducing tube is not usual. Analysis of electrical properties of individual crystals from the reducer tube or of single crystals drawn from the silicon by well known methods indicate that a purity of elemental silicon in excess of 99.999999% is easily obtained, or less than 10 parts per billion of impurity.

Instead of the method of reducing silicon monoxide above described, I have also used an alternative form of hydrogen reactor illustrated in FIG. 4. This provides even better results than the use of a fused silica or porcelain tube. This apparatus, however, is not heated by an induction heater, but by a resistance heater set within the reduction tube.

FIGURE 4, depicts a reactor 104 made of a hydrogen diffusing metal such as palladium which is set inside of a generallyy cylindrical steel jacket 106 which consists of 3 sections, two of which are split. In the lowest section 108, there is about a half inch layer of calcined magnesium oxide 110, which acts as an insulator, and the palladium reactor 104 is set on this. The palladium reactor 104 has an inlet tube, 112, for admitting silicon monoxide vapor. The clearance between the steel jacket 106 and the palladium reactor is about 1 inch on all sides, so that the reactor 104, can be set within the jacket 106, and the nozzle or inlet tube 112 which is 1¾ inches long can be positioned to pass through a steel nozzle 114, which projects about ¾ inch from the inner face of the steel jacket. The jacket section 108 has a lower nozzle 116 which serves as an inlet for hydrogen. It has an upper flange 118 for bolting to the next section. After the palladium reactor is positioned in section 108, the next steel section 120, which is also generally cylindrical and has flanges 122 and 124, and is split in halves vertically is mounted on the section 108, and the two halves of 106 are joined together by means of bolts through two vertical ridges on each half, and the two halves are thus joined to form one generally cylindrical piece, which is next joined firmly to section 108 by bolts, so that sections 108 and 120 in effect constitute one cylinder.

The section 120 has an exit nozzle 126, equipped with pressure gauge 150, which during operation serves as the vent for gases forced into the jacket. Nozzle or tube 126 is connected to a pressure release valve 128 which releases pressure at a pre-set figure such as for instance 20 atmospheres, or any other selected pressure. Steel dome 130 which also is in two halves is mounted on section 120 and has an opening 132 to accommodate outlet pipe 134, of the palladium reactor. The two halves of dome 130, after positioning, are bolted together, and then the completed steel dome is bolted by its flange 136 to the flange 124, and the palladium reactor is thus totally enclosed in the steel jacket 106, which is rendered tight at the various joints by usual means.

The reactor 104 is fabricated of palladium sheet and has inlet nozzle 112 which during operation admits silicon monoxide vapor. Its dome 138 and the outlet tube 134 are of platinum sheet. The dome 138 is fastened to the body of the palladium reactor by the companion flanges 140. Within the reactor is a fused silica block 142 on which rests a platinum rod framework 144, supporting and in electrical contact with a plurality of spaced tantalum foil strips 146. The platinum framework 144, and the tantalum foil strips 146, constitute a resistance heater for which the leads are platinum wires 148, which are carried in through metal disks which screw respectively into the platinum dome 138 and the steel dome 130.

In operation, the palladium reactor is completely set up, purified argon is admitted through nozzle inlets 112 and 116 to displace all air completely from the apparatus. Then hydrogen is admitted through inlet line 116 until the pressure on gauge 150 is, for example, 20 atmospheres, and the resistance heaters 144 and 146, are actuated until the temperature is 1400° C. as indicated by pyrometer 152, which is passed through the domes similarly to the leads 148. Then the source of silicon monoxide is swept with argon, as in the case of reduction in the quartz tube, and when the system is fully pressured with argon to about 3 atmospheres pressure as indicated by a gauge 154, and excess pressure is released by a pressure release valve 156 the solid silicon monoxide is heated by induction heating so that it vaporizes and passes by means of inlet tube 112 to the interior of the palladium tube where in contact with the diffused hydrogen it is reduced to elemental silicon. The resistance heating is run 15 minutes on and one minute off, so that the temperature fluctuations or pulsations strip the silicon from the tantalum foil and the silicon drops into space below the resistance heater. With an external pressure of hydrogen of 20 atmospheres, as indicated by gauge 150 and controlled by valve 128, and an internal pressure of 2 atmospheres as indicated by gauge 154 and controlled by valve 156, a total charge of silicon monoxide of 10 pounds vaporized from the still 52 of FIGURE 2 will be reduced in 6 hours. When the charge of silicon monoxide in still 52 has been completely evaporated the heating is cut off, the system is swept with argon, the hydrogen feed is cut off and the hydrogen in the jacket 106, is displaced by argon, and when the apparatus has cooled sufficiently it is disassembled and the elemental silicon is removed. The crystalline material has been found to be of extreme purity as indicated by its electrical properties, and purities corresponding to as little as 1 to 2 parts per billion of impurity have been obtained.

The following examples serve to illustrate various specific methods of carrying out the novel processes of my invention, as described generally above, but the invention is not to be regarded as limited thereby.

*Example 1*

The liner of the reaction vessel of FIGURE 1 was charged with a mixture of coarsely ground ferrosilicon and silica, consisting of 3.5 pounds of ferrosilicon containing 98.5% actual silicon and 7.5 pounds of pure, fine sand assaying 99% actual $SiO_2$. This charge was heated in the tantalum still as described to 1400° C. at 0.01 mm. of Hg absolute pressure, and condensed in the similar liner of the second tantalum still. The time required for the distillation was 5.25 hours. After cooling the silicon monoxide in the tantalum liner was found to weigh 9.98 pounds and a small additional amount was observed to have condensed and solidified on the walls of the tantalum still outside of the liner. There was a residue left in the original still of 0.75 pound which consisted chiefly of iron and aluminum oxides and silica, and gave qualitative tests for calcium, magnesium, titanium and zirconium. Spectroscopic tests showed the presence in trace amounts of a considerable number of metals.

The silicon monoxide was reduced by hydrogen in the fused silica reactor at 1400° C. with the use of 6 times the theoretically required amount of hydrogen. The yield of elemental silicon was a total of 5.75 pounds or approximately 90.5% based on the theoretical from 9.98 pounds of silicon monoxide. Part of the material was crystalline and part "fines." The fines were shown to be crystalline by X-ray diffraction diagrams.

*Example 2*

The charge used to produce silicon monoxide consisted of zircon, a moderately pure zirconium silicate, $ZrO_2.SiO_2$, containing some alumina, iron and titanium dioxide. The principal components were $ZrO_2$ 60.7% and $SiO_2$ 38.3%. The charge consisted of 7 pounds of the finely ground zircon intimately mixed with 3.3 pounds of finely crushed ferrosilicon containing 98.5% actual silicon. This was reacted as in Example 1 and yielded 5.25 pounds of silicon monoxide. The residue in the reactor was 5 pounds of zirconium oxide of a pale yellow color. This zirconium oxide residue contained approximately 1% each of titanium and aluminum, 1.5% of iron, 1.5% of silica and spectroscopic traces of many metals. The silicon monoxide was converted to silicon by hydrogen reduction exactly as in Example 1 with a yield of 2.95 pounds of elemental silicon of the same character as the product of Example 1.

*Example 3*

A charge of silicon monoxide was prepared from the same amount of raw materials under the same conditions as in Example 1, and the re-evaporated silicon monoxide was reduced by hydrogen in the palladium reducing tube at a temperature indicated by the pyrometer to be 1400° C., although the actual temperature in the resistance element was undoubtedly higher. The hydrogen pressure in the jacket was 20 atmospheres and within the reducing tube 2 atmospheres. The time required for reduction was 11 hours, and the amount of hydrogen used was 20 times the theoretical. The yield of elemental silicon was 5.5 pounds or approximately 86.5% of theory assuming that 10 pounds of silicon monoxide were produced as in Example 1.

*Example 4*

Silicon monoxide was distilled slowly from a charge contained in the tantalum receiver and allowed to condense in the presence of air in a fused silica receiver, consisting of an open tube, 4 inches in diameter and cooled by water. There was considerable fuming, but a white deposit was collected which was analyzed to be pure silicon dioxide. A quantity of this was fused to give a mass of fused silica which contained no detectable impurities when analyzed by standard methods. When enough of this pure silica was collected from several runs, it was converted to silicon monoxide by means of the fines from several reductions of silicon monoxide to elemental silicon. One pound of elemental silicon fines and 2 pounds of silica produced by the oxidation of pure silicon monoxide, were reacted under the conditions of Example 1. The silicon monoxide produced based on the silica used since the elemental silicon was present in excess is theoretically 2.93 pounds. This was reduced under the conditions of Example 3, and yielded 1.6 pounds of elemental silicon, a crystal of which had a resistivity corresponding to impurity not in excess of 1 part per billion.

It will be understood that departures and modifications may be made within the scope of the invention as disclosed, within the spirit of the appended claims.

I claim:

1. A method for the production of very high purity silicon which comprises reacting silicon and silica at a temperature between 1200° C. and 1400° C. under high vacuum corresponding to an absolute pressure not greater than 0.01 mm. mercury to form high purity silicon monoxide, reducing the silicon monoxide with an excess of hydrogen over the stoichiometric amount required for reduction, said hydrogen being diffused through the walls of a palladium tube at a pressure between about 5 and about 20 atmospheres, to form high purity elemental silicon, and recovering the pure silicon.

2. A method for the production of very high purity silicon which comprises reacting silicon and silica at a temperature between 1200° C. and 1400° C. under high vacuum corresponding to an absolute pressure not greater than 0.01 mm. mercury to form high purity silicon monoxide, reducing a portion of the silicon monoxide with an excess of hydrogen over the stoichiometric amount required for reduction, said hydrogen being diffused through the walls of a palladium tube at a pressure between about 5 and about 20 atmospheres, to form high purity elemental silicon, and recovering the pure silicon, and oxidizing the other portion of the silicon monoxide with oxygen to form high purity silicon dioxide, and recycling said silicon dioxide and reacting it with silicon in the first step to form silicon monoxide.

3. The method of claim 1 in which the reduction of the silicon monoxide is carried out with a mixture of hydrogen and an inert gas.

References Cited in the file of this patent

UNITED STATES PATENTS

| | | |
|---|---|---|
| 875,285 | Potter | Dec. 31, 1907 |
| 875,674 | Potter | Dec. 31, 1907 |
| 886,637 | Potter | May 5, 1908 |
| 2,428,178 | Reik et al. | Sept. 30, 1947 |

OTHER REFERENCES

Hackh's Chemical Dictionary, Third Ed., The Blakiston Co., 1944, page 729.

C. A. Jacobson's book, "Encyclopedia of Chemical Reactions," vol. 6, page 91 (1956), Reinhold Publ. Corp., N.Y.

Zapffe et al.: Article in "The Iron Age," January 29, 1942, pp. 34–39.

Zintl et al.: "Zeitschrift für anorganische und Allgemeine Chemie, Bd. 245 (1940), pages 1–3.

Sidgwick: Chemical Elements and Their Compounds, vol. 1, page 617 (1950), Oxford Univ. Press.

FIAT Final Report 789, "Experiments to Produce Ductile Silicon," Smatko, April 3, 1946.